United States Patent [19]

Foster et al.

[11] Patent Number: 5,583,993
[45] Date of Patent: Dec. 10, 1996

[54] METHOD AND APPARATUS FOR SYNCHRONOUSLY SHARING DATA AMONG COMPUTER

[75] Inventors: Gregg S. Foster, Woodside; Frederich N. Tou, Cupertino, both of Calif.

[73] Assignee: Apple Computer, Inc., Cupertino, Calif.

[21] Appl. No.: 189,104

[22] Filed: Jan. 31, 1994

[51] Int. Cl.$^6$ .................................................. G06F 15/16
[52] U.S. Cl. .............. 395/200.04; 395/800; 364/DIG. 1; 364/284; 364/284.3; 364/286
[58] Field of Search ................................. 395/200, 800, 395/700, 785, 500, 275, 153, 155, 157, 200.04, 827

[56] References Cited

U.S. PATENT DOCUMENTS

| | | | |
|---|---|---|---|
| 5,008,853 | 4/1991 | Bly et al. | 390/717 |
| 5,142,624 | 8/1992 | Patrick, II | 395/200 |
| 5,339,389 | 8/1994 | Bates et al. | 395/153 |
| 5,363,507 | 11/1994 | Nakayama et al. | 395/800 |
| 5,379,409 | 1/1995 | Ishikawa | 395/575 |
| 5,408,600 | 4/1995 | Garfinkel et al. | 395/153 |
| 5,446,491 | 8/1995 | Shibata et al. | 348/15 |
| 5,452,299 | 9/1995 | Thessin et al. | 370/62 |

OTHER PUBLICATIONS

Jon Udell, "Windows for Workgroups", BYTE, Nov. 1992, pp. 52–54.
Fritz Nelson, "Remote Control Software: InfoWorld Tests Six Modem Remote Control Packages", InfoWorld vol. 14, No. 9 pp. 68–81 Mar. 2, 1992.
O'Connor, Rory J., "Apple Banking on Newton's Brain", Apr. 22, 1992 San Jose Mercury News.
Weiman, Liza and Moran, Tom, "A Step toward the Future", Macworld Magazine, pp. 129–131, Aug. 1992.
Soviero, Marcelle M., "Your World According to Newton", Popular Science, Magazine, pp. 45–49, Sep. 1992.
Abatemarco, Fred, "From the Editor", Sep. 1992, Popular Science Magazine.

*Primary Examiner*—Mehmet B. Geckil
*Attorney, Agent, or Firm*—Hickman Beyer & Weaver

[57] ABSTRACT

A method for synchronously sharing data among a plurality of computer systems includes the step of determining the initiation of a shared space session. Upon initiation, a message is transmitted to remote computer systems to announce the initiation. A shared space view is then displayed on a screen of the computer system. The input into the shared space view of data is then determined and this data is shared among the computer systems in the shared space session. The method further includes determining whether a message has been received from remote computer systems and incorporating these messages into the shared space view. A further method of the present invention resynchronizes a participant into communication with a shared space session. The method includes the steps of selecting a close box in the shared space view, closing the view to terminate participation in the session and reinitiating participation to reestablish synchronous communication. Contents of the session are saved upon the termination of participation so that sessions can be recreated. An apparatus for performing the methods of the present invention is further disclosed. Included in the apparatus is the mechanisms for determining the initiation of a shared space session and for synchronously sharing data among a plurality of computer systems once initiation has occurred.

9 Claims, 9 Drawing Sheets

METHOD AND APPARATUS FOR SYNCHRONOUSLY SHARING DATA AMONG COMPUTER

BACKGROUND OF THE INVENTION

The present invention relates generally to computer systems, and more particularly to synchronously sharing data between computer systems.

Computerized personal organizers are becoming increasingly popular with a large segment of the population. Computerized personal organizers tend to be small, lightweight, and relatively inexpensive, and can perform such functions as keeping a calendar, an address book, a to-do list, etc. While many of these functions can also be provided in conventional computer systems, personal organizers are very well suited to the personal organization task due to their small size and portability. Personal organizers are available from such companies as Sharp and Casio of Japan.

A relatively new form of computer, the pen-based computer system, holds forth the promise of a marriage of the power of a general purpose computer with the functionality and small size of a personal organizer. A pen-based computer system is typically a small, hand-held computer where the primary method for inputting data includes a "pen" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion.

Once information is entered, the ability to share that information, either asynchronously or synchronously, with other systems is important to the advancement of computer usage. With asynchronous communication, a specific action or command must be performed to share entered data between systems. Data changes are therefore not shared until a user explicitly transmits them. This results in a delayed WYSIWIS (What You See Is What I See) interface among users. While this type of data exchange is beneficial, the ability to simultaneously share information between a plurality of systems as it is entered creates new opportunities to make computers an even greater tool. Such data exchange creates interpersonal communication, i.e., a conversation, between computer users and is achievable through synchronous data sharing. This synchronous communication allows several users to participate in data exchange at the same time to create a real-time WYSIWIS interface, so that collaboration of ideas occurs in much the same way as if the participants were in the same room and using the same sheet of paper or blackboard.

SUMMARY OF THE INVENTION

In accordance with the purpose of the present invention, a method and apparatus for synchronously sharing data among a plurality of computer systems is described.

A method for synchronously sharing data among a plurality of computer systems includes the step of determining the initiation of a shared space session. Upon initiation, a message is transmitted to remote computer systems to announce the initiation. A shared space view is then displayed on a screen of the computer system. The input into the shared space view of data is then determined and this data is shared among the computer systems in the shared space session. The method further includes determining whether a message has been received from remote computer systems and incorporating these messages into the shared space view.

A further method of the present invention resynchronizes a participant into communication with a shared space session. The method includes the steps of selecting a close box in the shared space view, closing the view to terminate participation in the session and reinitiating participation to reestablish synchronous communication. Contents of the session are saved upon the termination of participation so that sessions can be recreated or browsed later.

An apparatus for performing the methods of the present invention is further disclosed. Included in the apparatus is the mechanisms for determining the initiation of a shared space session and for synchronously sharing data among a plurality of computer systems once initiation has occurred.

By the methods and apparatus of the present invention, synchronous communication among multiple computer systems allows communication that would normally occur in a person-to-person exchange either by direct contact or via telephones to occur using computer systems. These and other advantages of the present invention will become apparent upon reading the following detailed descriptions and studying the various figures of the drawings.

DETAILED DESCRIPTION OF THE PREFERRED EMBODIMENTS

The present invention is well suited for pointer based computer systems such as the pen-based, pen-aware and mouse controlled systems that are currently popular. It should be appreciated that the present invention is suitable for use with a keyboard-based computer system as well, but for the purposes of illustration, the invention will be described in connection with a pen-based system.

Figure 1:
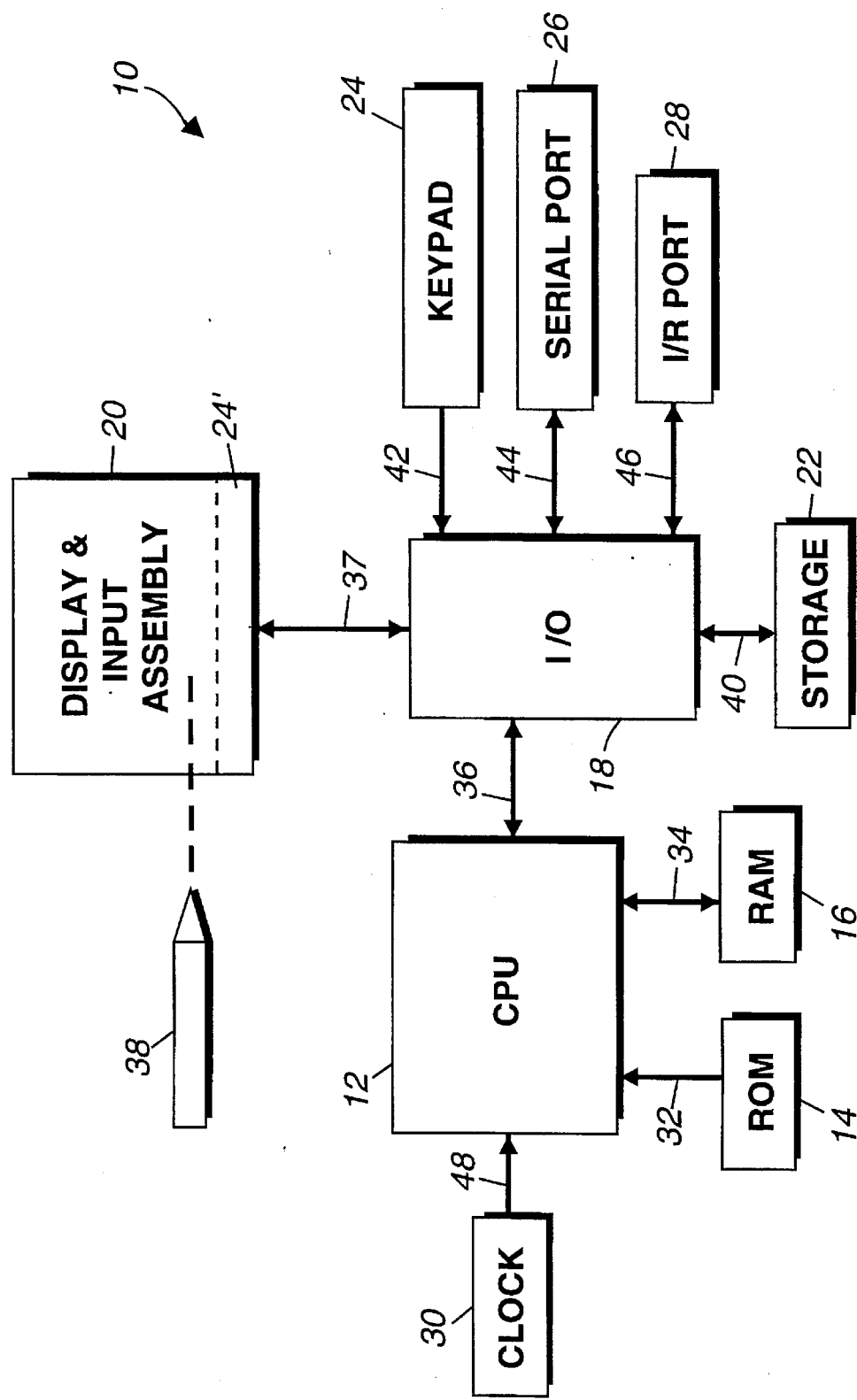
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22, a keypad (or keyboard) 24, a serial port 26, an infrared (I/R) port 28, and a clock 30.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 32. ROM 14 preferably contains the basic operating system for the pen-based computer system 10. CPU 12 is connected to RAM 16 by a bi-directional data bus 34 to permit the use of RAM 16 as scratch pad memory. ROM 14 and RAM 16 are also coupled to CPU 12 by appropriate control and address busses, as is well known to those skilled in the art. CPU 12 is coupled to the I/O circuitry 18 by bi-directional data bus 36 to permit data transfers with peripheral devices.

I/O circuitry 18 preferably includes a number of latches, registers and direct memory access (DMA) controllers. The purpose of I/O circuitry 18 is to provide an interface between CPU 12 and such peripheral devices as display assembly 20, mass storage 22, keypad 24, serial port 26, and I/R port 28.

Display assembly 20 of pen-based computer system 10 is both an input and an output device. Accordingly, it is coupled to I/O circuitry 18 by a bi-directional data bus 37. When operating as an output device, the display assembly 20 receives data from I/O circuitry 18 via bus 37 and displays that data on a suitable screen. The screen for display assembly 20 is preferably a liquid crystal display (LCD) of the type commercially available from a variety of vendors. The input device of display assembly 20 is preferably a thin, clear membrane which covers the LCD display and which is sensitive to the position of a stylus 38 on its surface. With such a structure, the membrane of the display assembly 20 can serve as an input "tablet". These position sensitive membranes are also readily available on the commercial market. Alternatively, other types of tablets can be used, such as inductively coupled tablets. Combination display assemblies such as display assembly 20 which include both the LCD and the input membrane are commercially available from such vendors as Scriptel Corporation of Columbus, Ohio.

Some type of mass storage 22 is generally considered desirable. Mass storage 22 can be coupled to I/O circuitry 18 by a bi-directional data bus 40. However, the mass storage 22 can be eliminated by providing a sufficient amount of RAM 16 to store user application programs and data. In that case, the RAM 16 can be provided with a backup battery to prevent the loss of data even when the pen-based computer system 10 is turned off. However, it is generally desirable to have some type of long term mass storage 22 such as a commercially available miniature hard disk drive, nonvolatile memory such as flash memory, battery backed RAM, a PCMCIA card, or the like.

Figure 2:
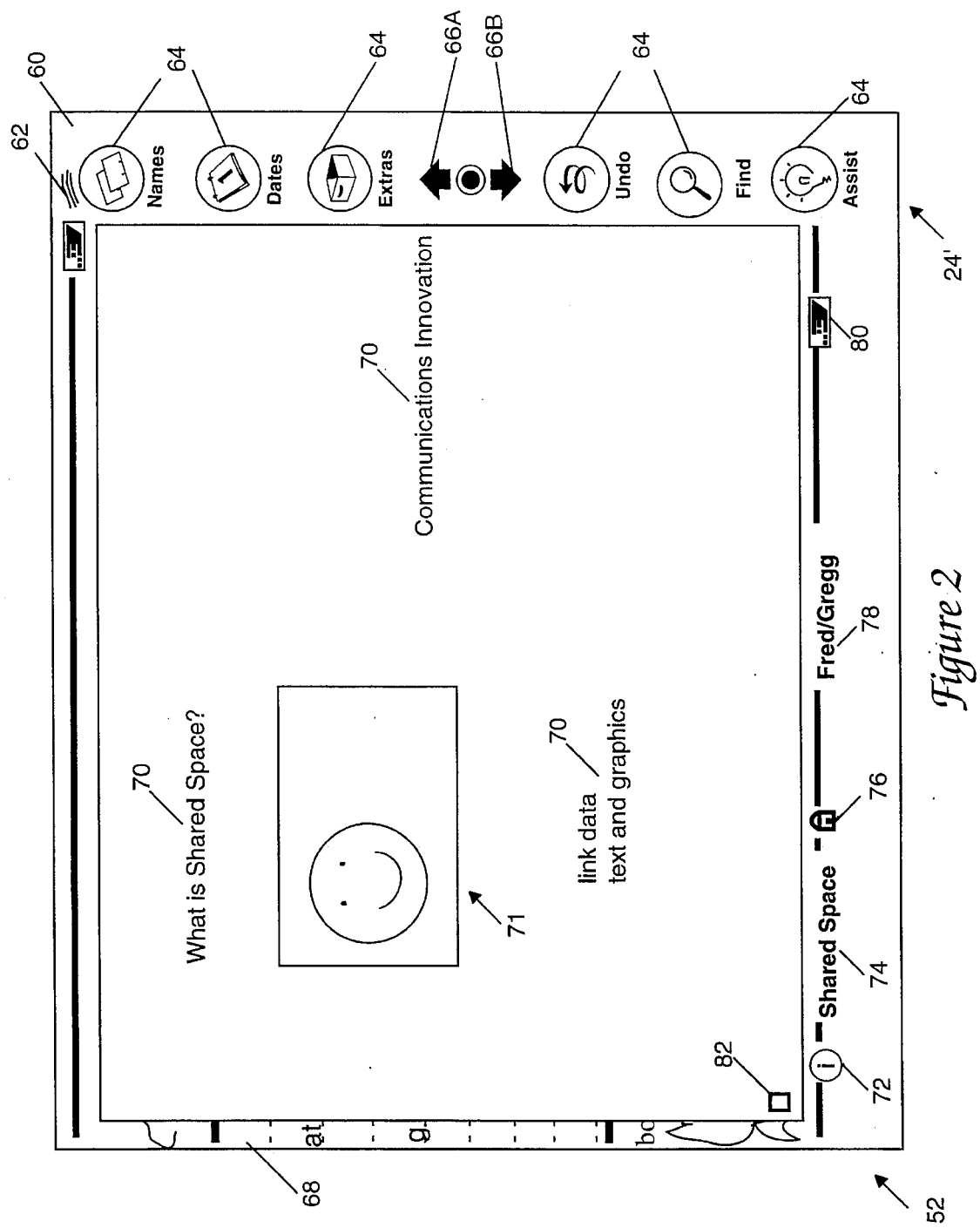
FIG. 2 illustrates an open shared space view on the display assembly of the computer system of FIG. 1.

The keypad 24 can comprise an array of mechanical buttons or switches coupled to I/O circuitry 18 by a data bus 42. Alternatively, keypad 24 can comprise an entire, standard QWERTY keyboard. In the present embodiment, a separate keypad 24 is not used in favor of a "pseudo" keypad 24'. This "pseudo" keypad 24' comprises "button" areas which are associated with a bottom edge of the tablet membrane that extends beyond the side edge or lower edge of the LCD display. These button areas are defined by a printed or silk-screened icons which can be seen through the transparent membrane of the input tablet. When the "buttons" are selected by engaging the stylus 38 with the membrane over these printed icons, the membrane senses the pressure and communicates that fact to the CPU 12 via data bus 37 and I/O 18. An example of pseudo keypad 24' is shown in FIG. 2.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Serial port 26 is coupled to I/O circuitry by a bi-directional bus 44. The serial port 26 can be used to couple the CPU to external devices and networks.

Infrared (I/R) port 28 is coupled to I/O circuitry by a bi-directional bus 46. The I/R port can be used for outgoing information (e.g. to control a printer or some other external device, or to communicate with other computer systems) or for incoming information from other computers or devices.

Clock 30 preferably comprises a real-time clock to provide real-time information to the system 10. Alternatively, clock 30 can simply provide regular clock pulses to, for example, an interrupt port of the CPU 12 which can count the clock pulses to provide the time function. However, this alternative clock embodiment tends to be wasteful of CPU processing power. Clock 30 is coupled to CPU 12 by a data bus 48.

In operation, information is input into the pen-based computer system 10 by "writing" on the screen of display assembly 20 with the stylus 38. Information concerning the location of the stylus 38 on the screen of the display assembly 20 is input into the CPU 12 via data bus 37 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14, RAM 16, or mass storage 22. The CPU 12 next produces data which is transferred to the display assembly 20 via I/O circuitry 18 and data bus 37 to produce appropriate images on the screen portion of the display assembly 20.

In FIG. 2, the pen-based computer system 10 of FIG. 1 is shown. A viewing screen 52 of the display assembly is exposed to the user. As used herein, the term "screen" will refer to the portion of the display assembly 20 which can display an image that can be viewed by a user. Also accessible to the user is the pseudo keypad 24' that was described with reference to FIG. 1.

In this preferred embodiment, the keypad 24', as explained previously, comprises a printed or silk-screened member 60 provided beneath a side or lower edge of a thin, clear, stylus-sensitive membrane 62 of the input "tablet." Alternatively, a keypad could comprise a mechanical keypad (or keyboard) 24, or a keypad could comprise "soft buttons" i.e. images generated at convenient locations on the screen 52, in which case a "button" would be activated by touching the stylus to the screen over the image of the button. The keypad 24' preferably includes a number of dedicated function buttons 64 and a pair of scroll buttons 66a and 66b. The operation of the scroll buttons 66a and 66b, and other aspects of computer system 10 are discussed in greater detail in co-pending U.S. patent application Ser. No. 07/868,013, filed Apr. 13, 1992 on behalf of Tchao et al., assigned to the assignee of the present invention and incorporated herein by reference in its entirety.

The underlying screen 68 illustrated in FIG. 2 is referred to as the "notepad", and is preferably an application program running under the operating system of the pen based computer system 10. In this preferred embodiment, the notepad is a special or "base" application which is always available beneath higher level applications. The notepad application, like other applications, runs within a window, which in this instance comprises the entire viewing screen 52. Therefore, as used herein, a "window"is the entire screen or any portion of an entire screen which is dedicated to a particular application program.

The term "object" will be used extensively in the following discussions. As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and word objects. There are many well known texts which describe object oriented programming. See, for example, *Object Oriented Programming for the Macintosh*, by Kurt J. Schmucher, Hayden Book Company, 1986.

In the present invention, objects are preferably implemented as part of a frame system that comprises frame objects related by a semantic network. A description of semantic networks can be found in "A Fundamental Tradeoff in Knowledge Representation and Reasoning", *Readings in Knowledge Representation*, by Brachman and Leveseque, Morgan Kaufman, San Mateo, 1985.

It will be noted there is a liberal use of graphic elements in the present invention. Processes for drawing lines on a computer screen are well known to those skilled in the art. For example, graphics software such as QUICKDRAW from Apple Computer, Inc. of Cupertino, Calif. can be used to draw lines, simple geometrical shapes, etc. A description of the QUICKDRAW graphics software is found in the book *Inside Macintosh, Volumes I, II,* and *III*, by C. Rose et al., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 52 forms a first or "root" layer. The view system automatically handles "taps" and other gestures of the stylus 38 on the screen 52 by returning information concerning the tap or gesture and any object to which it may be related. Again, the view system is described in greater detail in co-pending U.S. patent application Ser. No. 07/976,970, which has been incorporated herein by reference. It is therefore clear that the object oriented programming and view system software makes the implementation of the processes of the present invention less cumbersome than traditional programming techniques. However, the processes of the present invention can also be implemented in alternative fashions, as will be well appreciated by those skilled in the art.

FIG. 2 illustrates a view of an open shared space window overlying the notepad 68. As used herein, shared space is a generic name given to an area capable of being used for synchronous data exchange, i.e., synchronous collaboration, between a plurality of computer systems. The shared space view acts like a specialized note area and has some of the same functions, including saving to and from a clipboard area. For the participants in a shared space session, the same shared space view appears on each participant's screen, so that all data, including both text 70 and graphics 71 objects, are available to all participants. The appearance of the data is the same on each participant's screen, so that text is transmitted with the same characteristics, e.g., font, size, recognized, bold, as that on the input screen. Similarly, graphics appear the same as they are entered. In this way, a true conference of WYSIWIS is established among the participants.

The participation in a shared space session is initiated upon activation of the shared space application. An empty version of the shared space view opens, and at substantially the same time, an introductory message, i.e., a "hello", including both the user's name and net address, is transmitted in an attempt to establish a link with a shared space session that may already be in progress. For an activation that occurs within the vicinity of more than one active shared space session, a session to link with is randomly chosen. The transmission of data occurs through the use of diffuse I/R for wireless transmission or through wired transmission across a network as is well known to those skilled in the art. It should be appreciated that since data should appear the same for each participant's view, data is transmitted upon the completion of any required system recognition process, such as to distinguish input text from a gesture, so that it is transmitted at substantially the same time as it is entered. This synchronous data transmission is activated upon activation of the shared space application, and thus, there is no need to explicitly request the transmission of data.

Activation of the shared space is performed, for example, through selection of a command icon representing the application. Selecting in this instance refers to "tapping" the icon. A tap gesture involves placing the stylus 38 on the screen 52 for a short, predetermined length of time and then lifting the stylus without moving the stylus a significant amount. By way of example, placing the stylus on the screen for a period of less than in the range of one twentieth to one seconds may be appropriate, with one third of a second being an appropriate maximum hold period. Also, to qualify as a tap gesture, the stylus must not have been moved more than an insignificant distance across the screen. By way of example, movement of more than in the range of two to ten pixels may be considered enough to disqualify an input from being a tap gesture when the display screen has a resolution of approximately 80 pixels per inch. For example, a maximum movement of six pixels has been found to work well. The command icon is preferably stored in a central location, such as with other command icons available from a pop-up window displayed by the selection or "tapping" of the Extras button.

Figure 2A:
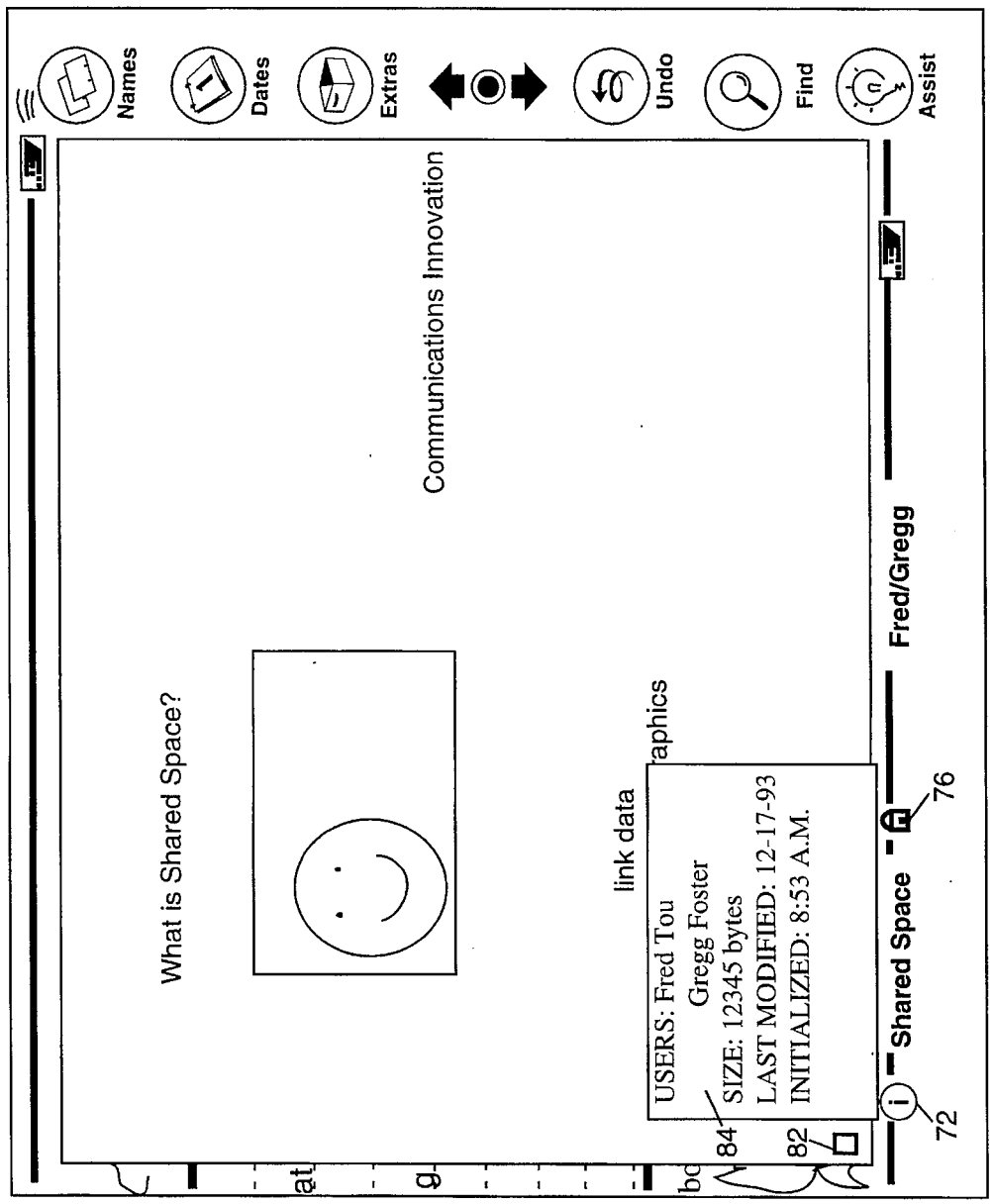
FIG. 2a is the shared space view of FIG. 2 illustrating the selection of the information icon to display a pop-up information window.
Figure 2B:
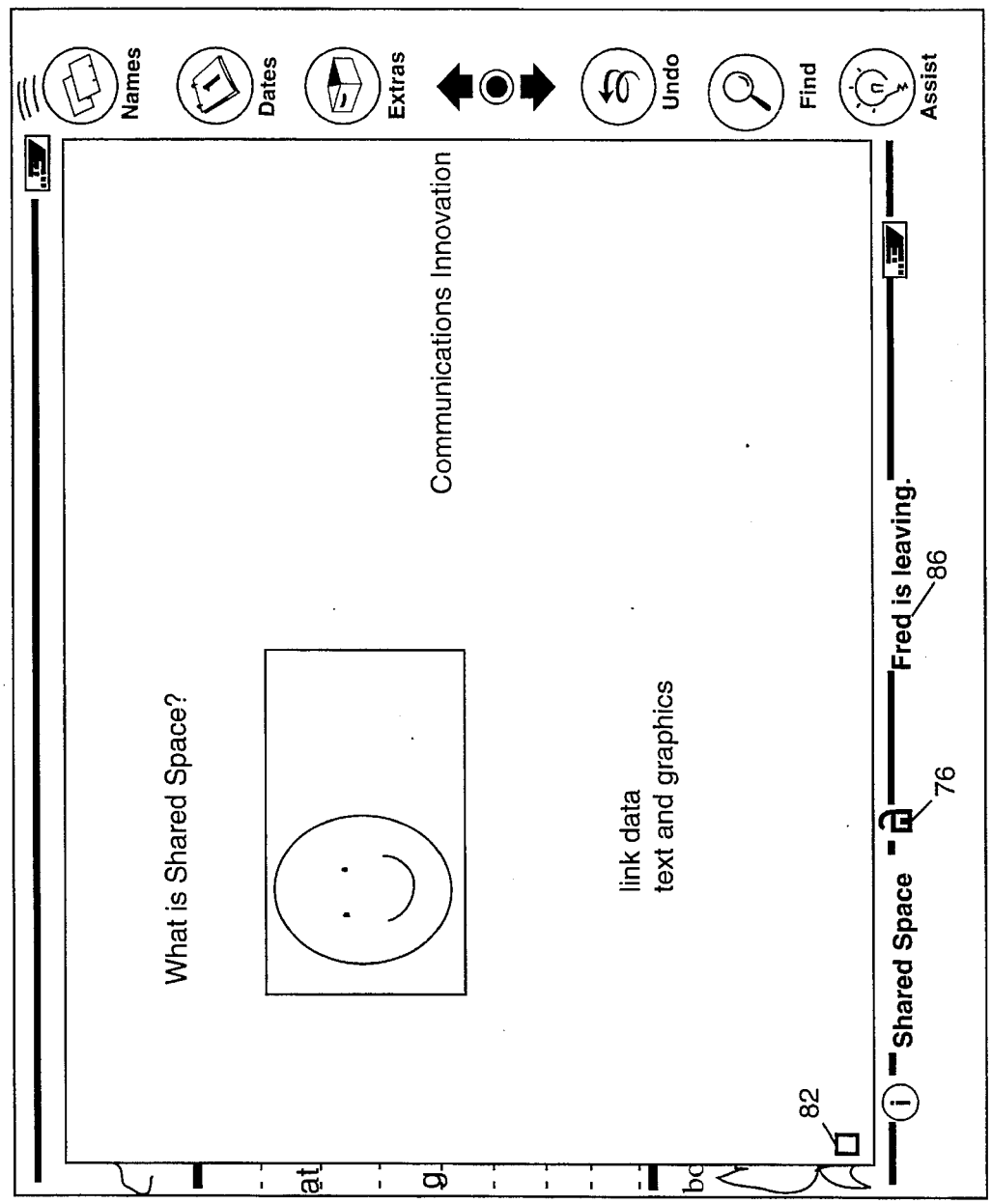
FIG. 2b is the shared space view of FIG. 2 illustrating the alteration of the lock icon and a change in the message area.

When active, the shared space view also includes a status bar having an information icon 72, a title bar 74, a lock icon 76, a message area 78, an action menu icon 80, and a close box 82. As illustrated in FIG. 2a, the information icon 72 provides a pop-up window 84 when selected, to display such information as a list of the participants, document size, last modification date, and a starting time of the current session. The pop-up window is closed by tapping anywhere on the screen or through selection of a close box, if one is provided in the window. Tapping on the lock icon 76 allows a session to be "locked", so that no new participants are allowed into the current session, or "unlocked" so that new participants are allowed. Changing of the lock status is achieved by simply selecting the lock icon 76. The status of the lock is indicated visually by the lock icon, so that in the case of a locked session, the icon appears as a closed lock, such as that shown in FIG. 2a, while an unlocked session appears as an open lock, such as that shown in FIG. 2b. Of course, alternate representations of the lock status are possible. The message area 78 similarly displays various messages received during a session including introduction messages, termination messages, acknowledgment messages, and a shortened participant list. An example of a termination message 86 is illustrated in FIG. 2b. Various commands for routing data, including a print command and fax command, are accessible by selecting the action menu icon 80 to produce a pop-up menu containing the various commands. By way of example, routing methods are described in co-pending U.S. patent application Ser. No. 08/130,049, entitled "Method for Routing Items within a Computer System" filed Sep. 30, 1993 on behalf of Foster et al., assigned to the assignee of the present invention, the disclosure of which is hereby incorporated herein in its entirety.

The selection of the close box 82 closes the shared space view as well as quits the operation of the shared space application. Quitting the application ends participation in the shared space session and causes a termination message, i.e., a "good-bye" message, including both the user's name and net address, to be transmitted to the other participants, so that they know that someone has left the session. The contents of the shared space message are then saved automatically or by an explicit user request to a note area. In this way, data from a session is maintained. The processes for handling a user's termination as well as other messages and data exchanges during a session are presented in greater detail in the following description of FIGS. 3–8.

Figure 3:
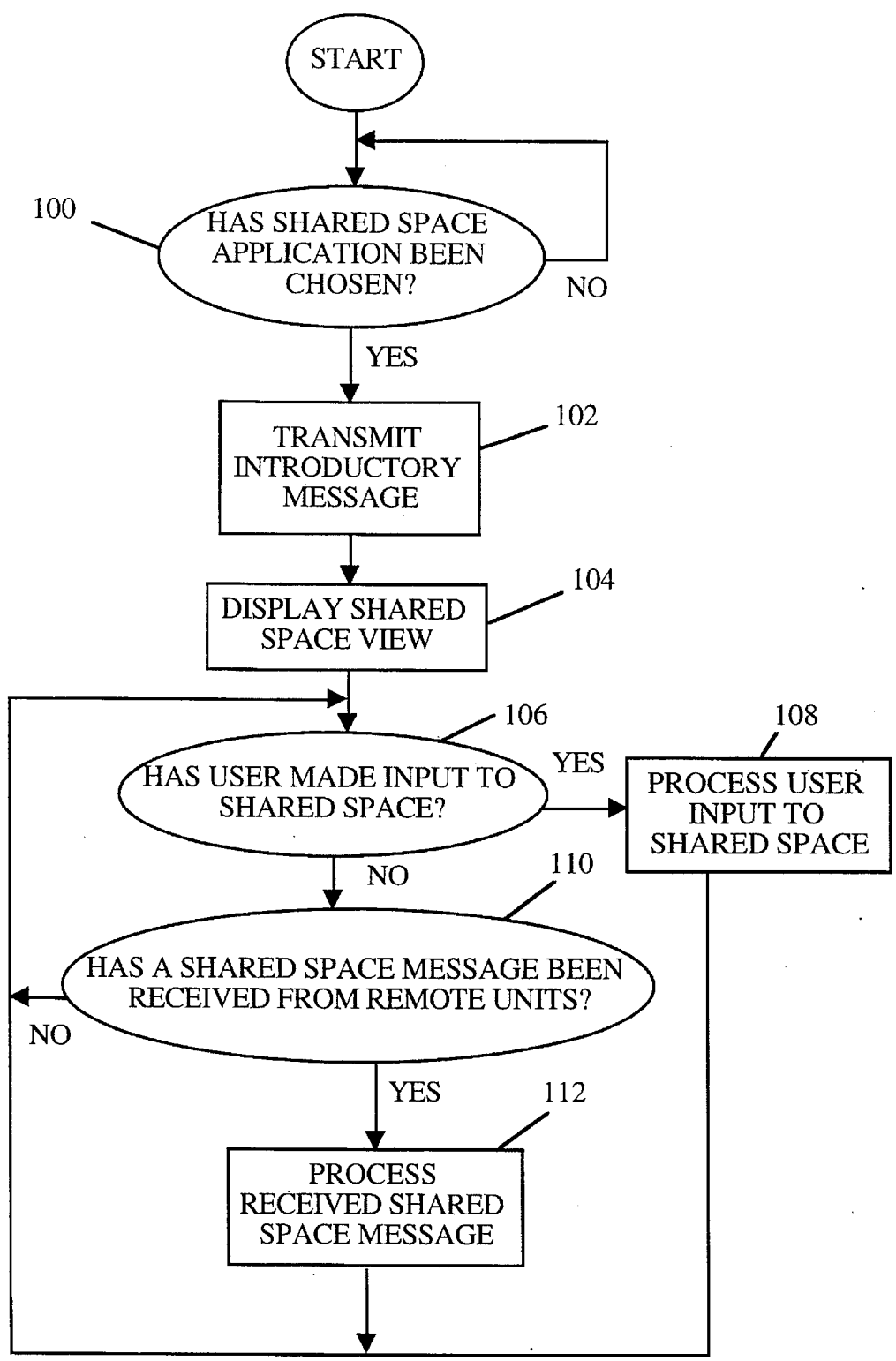
FIG. 3 is a flow diagram representing the logic in the overall collaboration process in accordance with the present invention.

The flow diagram of FIG. 3 illustrates the steps in the overall process of the present invention. The logic begins with step 100 in which the activation of the shared space application is determined. Once the application is activated, such as by selecting a command icon for the application as mentioned previously, the process continues with step 102 to transmit an introduction message to any system currently having an active shared space. This step is equivalent to sending out a "hello" message to all the current users of the shared space to inform them that a new participant is trying to enter the session. An empty shared space view is then displayed in step 104. The logic then proceeds to step 106 to determine whether inputs have been performed in the empty shared space by the new user. When inputs have been made, such as to perform edits or to select an icon, they are processed in step 108, which is presented in greater detail with reference to the flow diagram of FIG. 4. When no user inputs have been detected, the logic continues with step 110 to determine if a message, such as an acknowledgment message in response to a "hello", has been received from any remote users of the shared space. The lack of messages from remote users returns the process to step 106 to again check for user inputs. However, when a remote user message has been received, it is processed in step 112, the details of which are given with reference to FIG. 5. Once an input has been processed in either step 108 or 112, the logic returns to step 106 to continue checking for user inputs.

Figure 4:
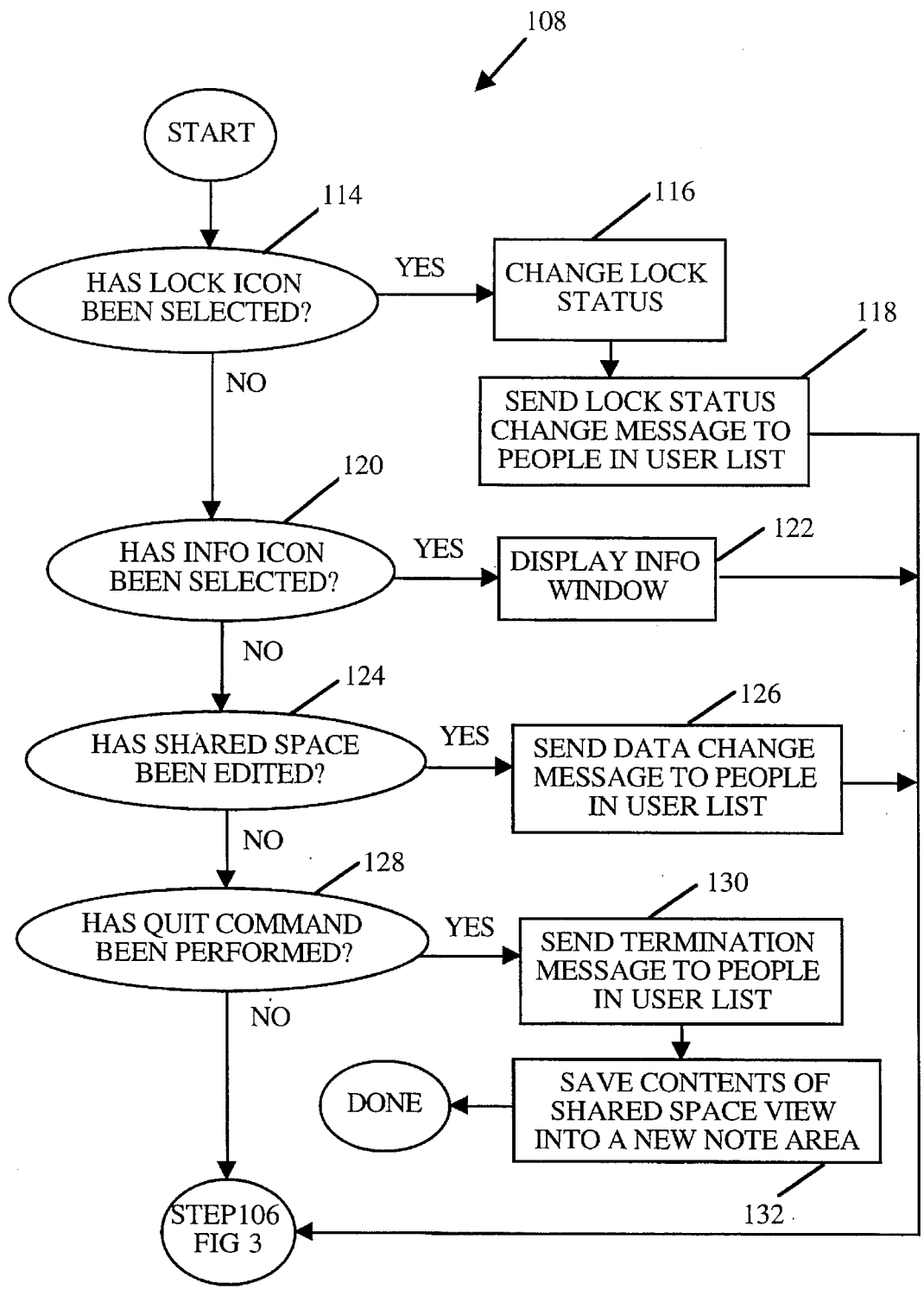
FIG. 4 is a flow diagram representing the logic for the processing of an input from a local shared space user (step 108 of FIG. 3)

For the processing of step 108, there are four basic types of inputs that a user makes into the shared space, as will be described with reference to FIG. 4. Three of these are related to selections made on the status bar of the shared space view, while the fourth is the actual editing of the shared space. Of course, it should be appreciated that additional inputs including an input to resize or scroll the shared space view are possible as well in alternative embodiments. It should also be appreciated that although the action menu icon could also be selected, the processing of that selection is described in the previously incorporated co-pending U.S. patent application Ser. No. 08/130,049 and is therefore not addressed by the processes of the present invention. The flow diagram of FIG. 4 presents the logic for processing the four basic inputs in greater detail. The process begins in step 114 by determining if the lock icon has been selected. Again, selection is achieved by tapping on the icon with the stylus. If step 116 determines that the lock icon has been selected, the status of a lock flag is alternated from a 1 to a 0 or a 0 to a 1 as well as the appearance of the lock icon from closed to open or open to closed to reflect the selection. The change in lock status is then transmitted to all the shared space users in the participant list in step 118, so that all of the current session participants are aware of the change. The process then returns to step 106 of FIG. 3 to await a next input.

When the lock icon has not been selected, the logic proceeds to step 120 to determine whether the information icon has been selected. The selection of the information icon causes a pop-up window containing such items as a current participant list, session initiation time, document size, and date of last modification, to be displayed in the shared space view, as represented in the logic by step 122 and as illustrated in FIG. 2a. The process then returns to step 106 to await the next input.

Following a negative result from step 120, i.e., the information icon has not been selected, the process continues with step 124 to identify if an edit has been performed by the user in the shared space view. When an edit has been made, the change is transmitted to all of the participants currently listed in the participant list in step 126. Edits include any kind of graphical or textual inputs capable of fitting in the shared space view. Edits also include deletions or alterations to already existing data in the shared space. Conflicts in editing, such as when more than one participant attempts to edit an already existing item, are avoided by including an indicator, such as reverse highlighting, to act as a "busy" signal to make all participants aware of an ongoing edit to a particular item. Alternatively, a telepointer, such as an arrow, could also be used to point to items while they are being edited along with a label accompanying the telepointer to identify the participant performing the edit. After transmitting the edit, the logic continues with step 106 to wait for the next input.

If no edits are detected, the process continues with step 128 which determines whether a quit command has been input. By way of example, a quit command may be executed by the selection of the close box. Upon the execution of a quit command, a termination or "good-bye" message indicating the user's termination in participation of the session is sent to all the participants in the participant list in step 130. The contents of the session are then saved to a note area automatically or by an explicit user request to have them saved in step 132 before the shared space application is no longer active. The note area contains a header or banner that lists the participants of the session as well as a session quitting time so that all data for the session is maintained in the note. To reenter a session after performing a quit, the shared space application has to be restarted. Restarting allows a user to reestablish synchronous communication when an inadvertent disconnection from a session occurs, such as when an I/R port is blocked temporarily when using wireless communication. Alternatively, a button or box for restarting participation in a shared space session could be included in the shared space view to perform the same function as a quit and restart when selected. When no quit command is executed, the process returns to step 106 to check for the next input.

In the foregoing explanation the process has been described as if the checking steps 114, 120, 124, and 128 are serially executed. However, as will be appreciated by those skilled in the art, in practice such a checking algorithm is not specifically required. Rather, in practice, the various described functions (i.e. steps 114–118, 120–122, 124–126, and 128–132) are call routines which are executed when called. To call the functions, the reviewer can select the associated button, icon, etc. in the feedback interface. Alternatively, they could be called by selecting a menu item in a pull down menu, by keyboard commands or in any other suitable manner.

Figure 5:
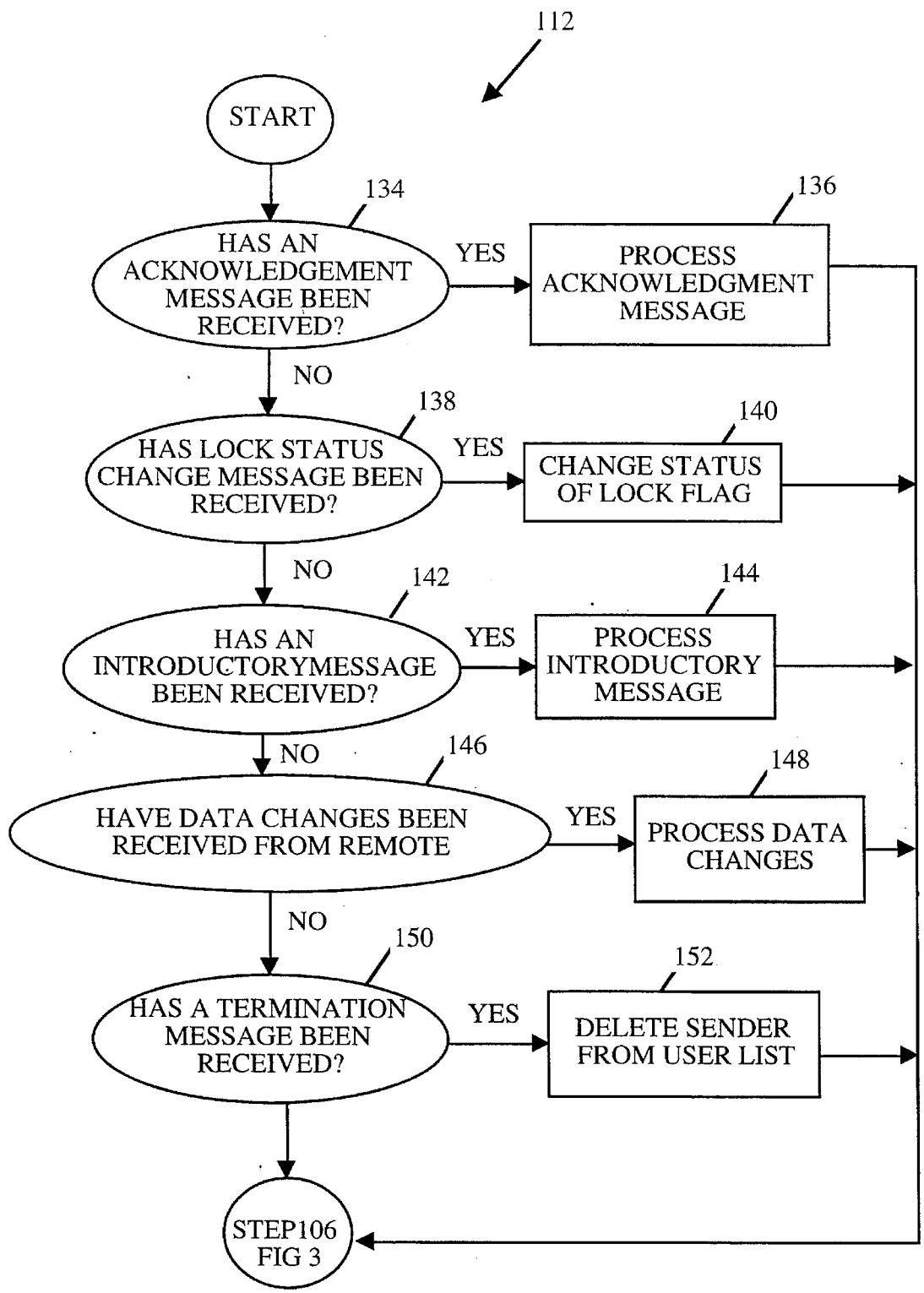
FIG. 5 is a flow diagram representing the logic for the processing of a message received from a remote user of the shared space (step 112 of FIG. 3)

Similar to the four types of inputs that are processed in step 108, there are five basic types of reception messages that are processed by step 112. In fact, three of the inputs prompt three of the reception messages. FIG. 5 presents a flow diagram illustrating the logic of step 112 for processing these messages. The process begins in step 134 by determining if an acknowledgment message has been received. An acknowledgment message is received in response to the initial "hello" that a user's unit sends out upon activation of the shared space and includes a list of the current participants and of the data objects in the shared space. The processing of the reception of an acknowledgment of step 136 is described in greater detail in the flow diagram of FIG. 6. Upon completion of the processing, the logic returns to step 106. When no acknowledgment is received as determined in step 134, the process continues with step 138 to determine whether a lock status change message has been received. A lock status change message is transmitted when a remote user has changed the lock status in their view of the session, as described previously, so that the recipient of the message changes their lock status to maintain the same lock status for the session. This is performed by step 140 of the process in which the lock flag status is changed. The process is then ready to wait for the next input in step 106.

When step 138 determines that no lock change message has been received, the logic continues with step 142 to determine whether an introductory message has been received from a remote user. This message is the "hello" received when a new user has activated the shared space application. When an introductory message is received, it is processed in step 144. The steps involved for this processing are presented in greater detail with reference to the flow diagram of FIG. 7. After completing this processing, the logic returns to step 106. When no introductory message has been received, the logic proceeds to step 146 to identify whether any edits have been received from any of the remote users. Such edits are processed in step 148. The steps for this processing are presented in FIG. 8. If there are no data changes, the next step 150 checks for reception of a termination message. A termination message is received when a remote user selects the close box in the shared space view to quit the shared space application. When this "good-bye" message is received, such as that shown in FIG. 2b, the sender of the message, is removed from the participant list in step 152, so that any further actions in the shared space are not transmitted to that system. After performing the participant deletion or if no termination message is received, the process returns to step 106 to await the next input.

Figure 6:
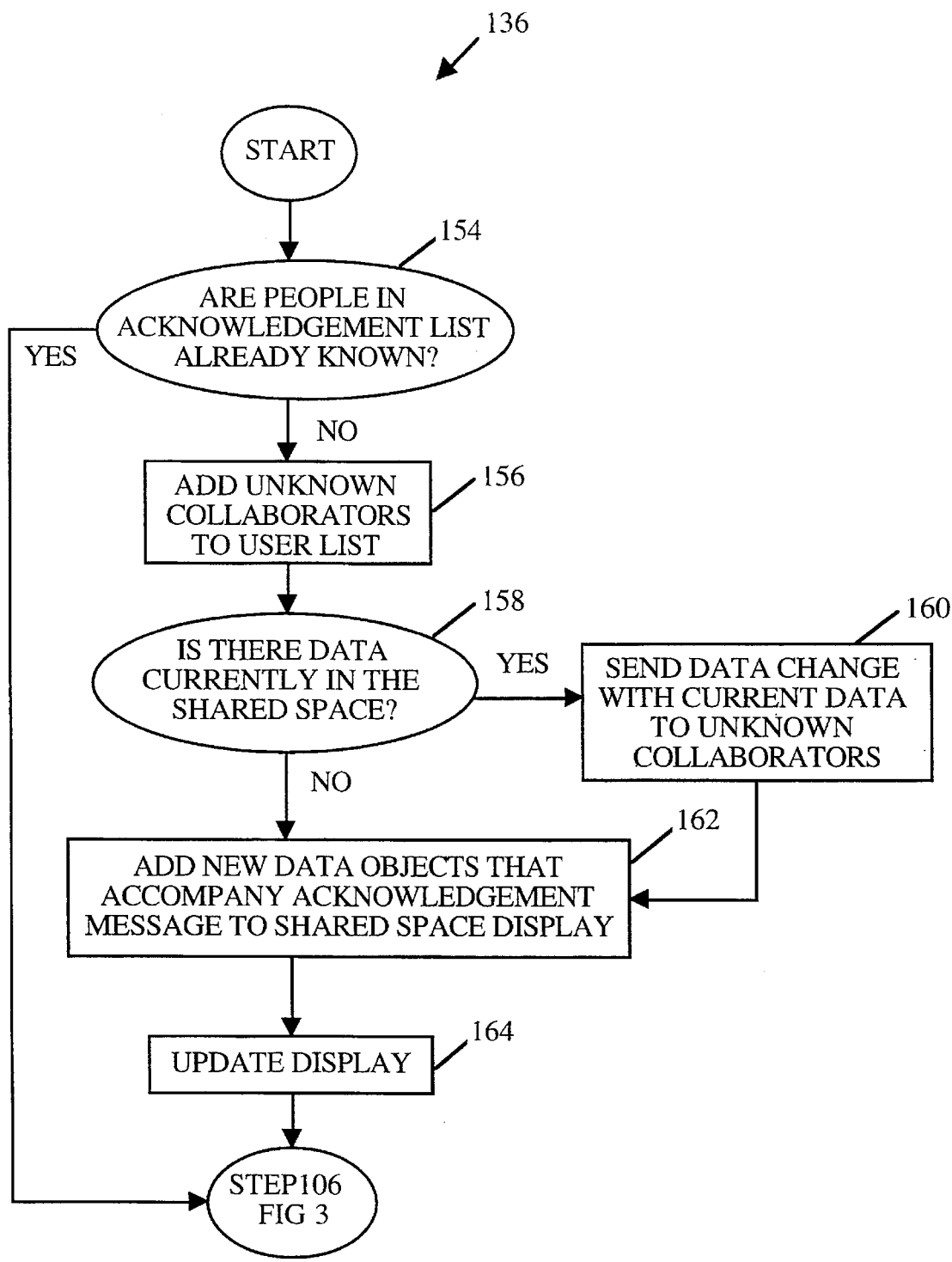
FIG. 6 is a flow diagram representing the logic for the processing of a received acknowledgment message (step 136 of FIG. 5)
Figure 7:
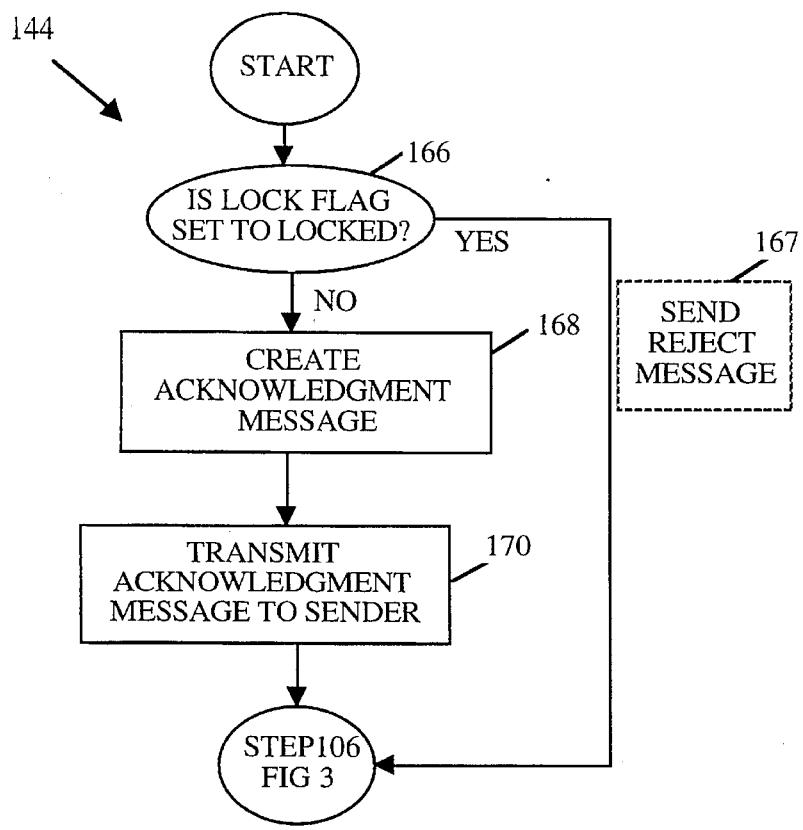
FIG. 7 is a flow diagram representing the logic for the processing of a received introductory message (step 144 of FIG. 5)

Turning now to the processing of the received messages, the receipt of an acknowledgment message is addressed by the logic in the process illustrated in FIG. 6. An acknowledgment message includes not only an identification of the sender of the message but a list of all the current participants that are known to the sender as well. Therefore, for each acknowledgment message received, the receiver determines in step 154 if the sender and/or any of the listed participants have already been identified in a participant list from a previously received acknowledgment message. When the sender and all of the participants have already been identified, no further processing steps are necessary, and the logic returns to step 106. When the sender and/or any of the participants have not been previously identified, the process continues with step 156 and adds the unknown user(s) to the recipient's participant list. The logic then proceeds with step 158 to determine if any data is currently in the shared space. When data is present, the newly added participant has not yet received these changes since they were previously unknown, so these data changes are sent to the added user in step 160. After sending any data changes or when no data has been added, in the next step 162, any data accompanying the received acknowledgment message is added to the shared space and the display is updated in step 164 to include this data before returning to step 106 to wait for the next input. The series of steps in this process allows the user sending out the "hello" to receive in one acknowledgment message all the data currently being shared as well as a listing of all of the participants of the session so that proper collaboration occurs. Once a first acknowledgment is received, the user has all the information needed to participate fully in the session, so that no new data is received when subsequent acknowledgments are received from other current participants.

On the other side of processing receipt of an acknowledgment message is the processing of transmission of an acknowledgment message in response to an introduction message. The steps of processing a received introduction message are presented in the flow diagram of FIG. 7. The process begins in step 166 with the determination of whether the lock flag is set to locked. When the lock flag is set, the session trying to be entered is closed to new participants, and the logic returns to step 106 to wait for the next input. Alternatively, as shown in the dashed step 167, the receiver of the introductory message transmits a reject message in response to inform the sender that their attempt to enter the session was rejected, before the process returns to step 106. If the lock flag is not set, however, the process continues with step 168 with the creation of the acknowledgment message in response to the introductory message. As explained previously, an acknowledgment message includes both a list of participants and the data currently in the shared space. This acknowledgment message, when formed, is transmitted in step 170 to the sender of the introductory message. The processing of the introductory message is then completed, and the logic returns to step 106 to wait for the next input.

Figure 8:
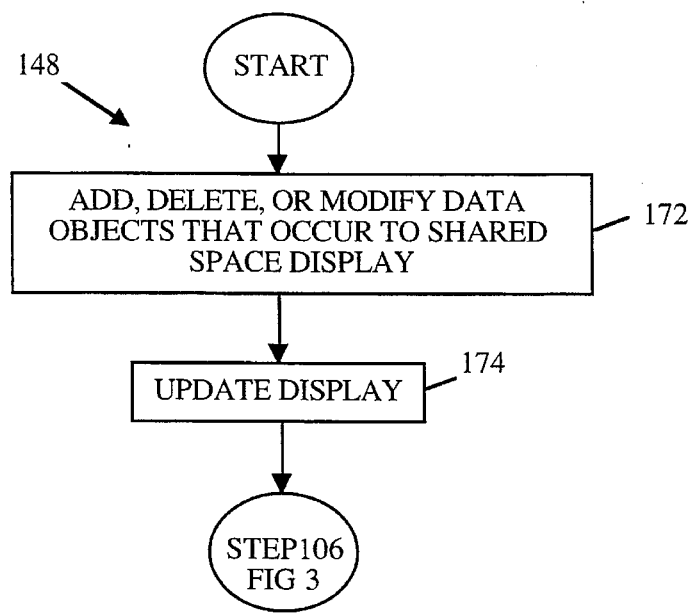
FIG. 8 is a flow diagram representing the logic for the processing of a received data change (step 148 of FIG. 5).

The remaining processing is directed at the handling of data changes received from a remote user. FIG. 8 illustrates the steps involved in this process. The logic begins in step 172 with the addition of the received data changes, which includes new objects, deleted objects, and changed objects, to the shared space view. In step 174, the display is updated to incorporate these data changes. The processing for received data changes is then completed, and the logic returns to step 106 to continue processing inputs.

While this invention has been described in terms of several preferred embodiments, there are alterations, permutations, and equivalents which fall within the scope of this invention. It should also be noted that there are many alternative ways of implementing the processes of the present invention. Particularly, although the transmission capabilities are described in terms of wired network or wireless I/R, other forms of transmission can also be used, such as radio frequency. Further, although the determination steps are described serially in the described embodiment, call routines can be used to implement many of these steps and are performed upon receipt of an appropriate command input. It could also include communication between systems with landscape and portrait screens. It is therefore intended that the following appended claims be interpreted as including all such alterations, permutations, and equivalents as fall within the true spirit and scope of the present invention.

What is claimed is:

1. A method for sharing data synchronously between a plurality of computers, the method comprising the steps of:

activating a shared space session;

displaying a first shared space view on a screen of said first computer system when said shared space session is active;

automatically determining whether an input has been made in said first shared space view of said first computer system when said first shared space view is displayed;

implementing said input in said first shared space view when it has been determined that said input has been made is said first shared space view;

automatically sending a shared space message to an at least one remote computer system when said input has been implemented in said first shared space view, said shared space message including an instruction, said instruction configured to cause said remote computer system to implement said input in a second shared space view associated with said remote computer system, wherein said first and second shared space views appear the same after said input is implemented in said second shared space view when said shared space session is active;

automatically determining whether a shared space message indicative of a remotely recognized input has been received from said remote computer system at said first computer system when said shared space session is active, said step of automatically determining whether a remotely recognized input has been received further comprising the substep of determining whether an acknowledgment message has been received when said shared space session is active; and implementing said shared space message into said first shared space view when it has been determined that said shared space message has been received, said step of implementing said shared space message including the substep of processing said acknowledgment message when it has been determined that said acknowledgment message has been received, wherein said step of processing said acknowledgment message further comprising the substeps of:

determining whether said acknowledgment message has been received from a currently identified remote computer system when it has been determined that said acknowledgment message has been received;

adding said remote computer system to a user list when it has been determined that said acknowledgment message has not been received from a currently identified remote computer system;

determining whether data is present in said first shared space view when said remote computer system has been added, wherein when data is present, said data is transmitted to said added remote computer system;

adding new data objects that accompany said acknowledgment message to said first shared space view when it has been determined that said acknowledgment message has not been received from a currently identified remote computer system; and refreshing said display of said first shared space view when said new data objects have been added;

whereby the first and second shared space views appear the same when said shared pace view is active and may include textual, formatted and graphical information and whereby an input to said first shared space view or to the second shared space view will automatically be implemented in said first shared space view and in said second shared space view when said shared space session is active.

2. A method for sharing data as recited in claim 1 wherein:

said step of automatically determining whether a remotely recognized input has been received further comprises the substep of determining whether a change in lock status message has been received when said shared space session is active; and said step of implementing said shared space message into said first shared space view includes the substep of changing a lock status when it has been determined that said change in lock status message has been received.

3. A method for sharing data as recited in claim 2 wherein:

said step of autommatically determining whether a remotely recognized input has been received further comprises the substep of determining whether an introductory message has been received when said shared space session is active; and said step of implementing said shared space message into said first shared space view includes the substep of processing said introductory message when it has been determined that said introductory message has been received.

4. A method for sharing data as recited in claim 3 wherein:

said step of automatically determining whether a remotely recognized input has been received further comprises the substep of determining whether a data input has been performed at said remote computer system in said second shared space view when said shared space session is active; and said step of implementing said shared space message into said first shared space view includes the substep of: processing said data input when it has been determined that said data input has been performed.

5. A method for sharing data as recited in claim 4 wherein:

said step of automatically determining whether a remotely recognized input has been received further comprises the substep of determining whether a remote quit message has been received when said shared space session is active; and said step of implementing said shared space message into said first shared space view includes the substep of: deleting a sender of said remote quit message from a user list when it has been determined that said remote quit message has been received.

6. A method for sharing data as recited in claim 3 wherein said step of processing said introductory message further comprises the substeps of:

determining whether a lock flag has been set to locked when it has been determined that said introductory message has been received;

creating an acknowledgment message when it has been determined that said lock flag is not set to locked; and transmitting said acknowledgment message to a sender of said introductory message when it has been determined that said lock flag is not set to locked.

7. A method for sharing data as recited in claim 6 wherein when said lock flag is set to locked when it has been determined that said introductory message has been received, a reject message is transmitted to sender of said introductory message.

8. A method for sharing data as recited in claim 4 wherein said step of processing said data input further comprises the substeps of:

adding said data input to said first shared space view when it has been determined that said data input has been performed; and refreshing said display of said first shared space view when said data input has been added.

9. A method as recited in claim 1 wherein when said acknowledgment message has been received from a currently identified computer system, said method returns to said step of automatically determining whether an input has been made.

* * * * *